United States Patent
Jun

(10) Patent No.: US 8,196,170 B2
(45) Date of Patent: Jun. 5, 2012

(54) METHOD OF CONNECTING TO INTERNET VIA BROADCAST RECEIVING DEVICE AND APPARATUS FOR THE SAME

(75) Inventor: Goo Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 814 days.

(21) Appl. No.: 11/590,835

(22) Filed: Nov. 1, 2006

(65) Prior Publication Data

US 2007/0101385 A1    May 3, 2007

(30) Foreign Application Priority Data

Nov. 1, 2005    (KR) .................. 10-2005-0103820

(51) Int. Cl.
*H04N 5/445* (2006.01)
*G06F 3/00* (2006.01)
*H04N 7/173* (2006.01)
*H04N 5/50* (2006.01)
*H04J 3/24* (2006.01)
*H04H 20/28* (2008.01)

(52) U.S. Cl. ............. 725/51; 725/56; 725/109; 725/112; 348/570; 370/473; 370/487

(58) Field of Classification Search ............... 725/51, 725/56, 109, 112; 348/570; 370/473, 487
See application file for complete search history.

(56) References Cited

U.S. PATENT DOCUMENTS

| | | | |
|---|---|---|---|
| 5,895,462 A | 4/1999 | Toki | |
| 6,353,613 B1 * | 3/2002 | Kubota et al. | 370/389 |
| 6,483,547 B1 * | 11/2002 | Eyer | 348/473 |
| 6,522,342 B1 * | 2/2003 | Gagnon et al. | 715/716 |
| 6,587,873 B1 | 7/2003 | Nobakht et al. | |
| 7,080,401 B2 * | 7/2006 | Kim | 725/139 |
| 2003/0033607 A1 | 2/2003 | Schwalb | |
| 2003/0233451 A1 * | 12/2003 | Ludvig et al. | 709/225 |
| 2004/0250292 A1 * | 12/2004 | Okamoto et al. | 725/131 |
| 2010/0218212 A1 * | 8/2010 | Kuh | 725/39 |

FOREIGN PATENT DOCUMENTS

| | | |
|---|---|---|
| JP | 11-275537 A | 10/1999 |
| JP | 2001-243190 A | 9/2001 |
| KR | 1020000038389 A | 7/2000 |
| KR | 10-2001-0018978 A | 3/2001 |
| KR | 10-2001-0064517 A | 7/2001 |
| KR | 2002-0040265 A | 5/2002 |
| KR | 10-2003-0038016 A | 5/2003 |
| KR | 10-2004-0057136 A | 7/2004 |
| WO | 99/63759 A2 | 12/1999 |
| WO | 01/56225 A2 | 8/2001 |
| WO | 2004/038538 A2 | 5/2004 |
| WO | 2004/077768 A1 | 9/2004 |

OTHER PUBLICATIONS

Extended European Search Report issued on May 27, 2011 in counterpart European Application No. 06812274.6.

* cited by examiner

*Primary Examiner* — Hoang-Vu A Nguyen-Ba
(74) *Attorney, Agent, or Firm* — Sughrue Mion, PLLC

(57) ABSTRACT

A method of connecting to the Internet via a broadcast receiving device and an apparatus for the same are provided. The method includes extracting transport stream (TS) from a received broadcast signal, obtaining mapping information between channel numbers and web addresses from the TS, and if a channel number selected by a user is included in the mapping information, connecting to the Internet via a web address mapped to the selected channel number.

32 Claims, 9 Drawing Sheets

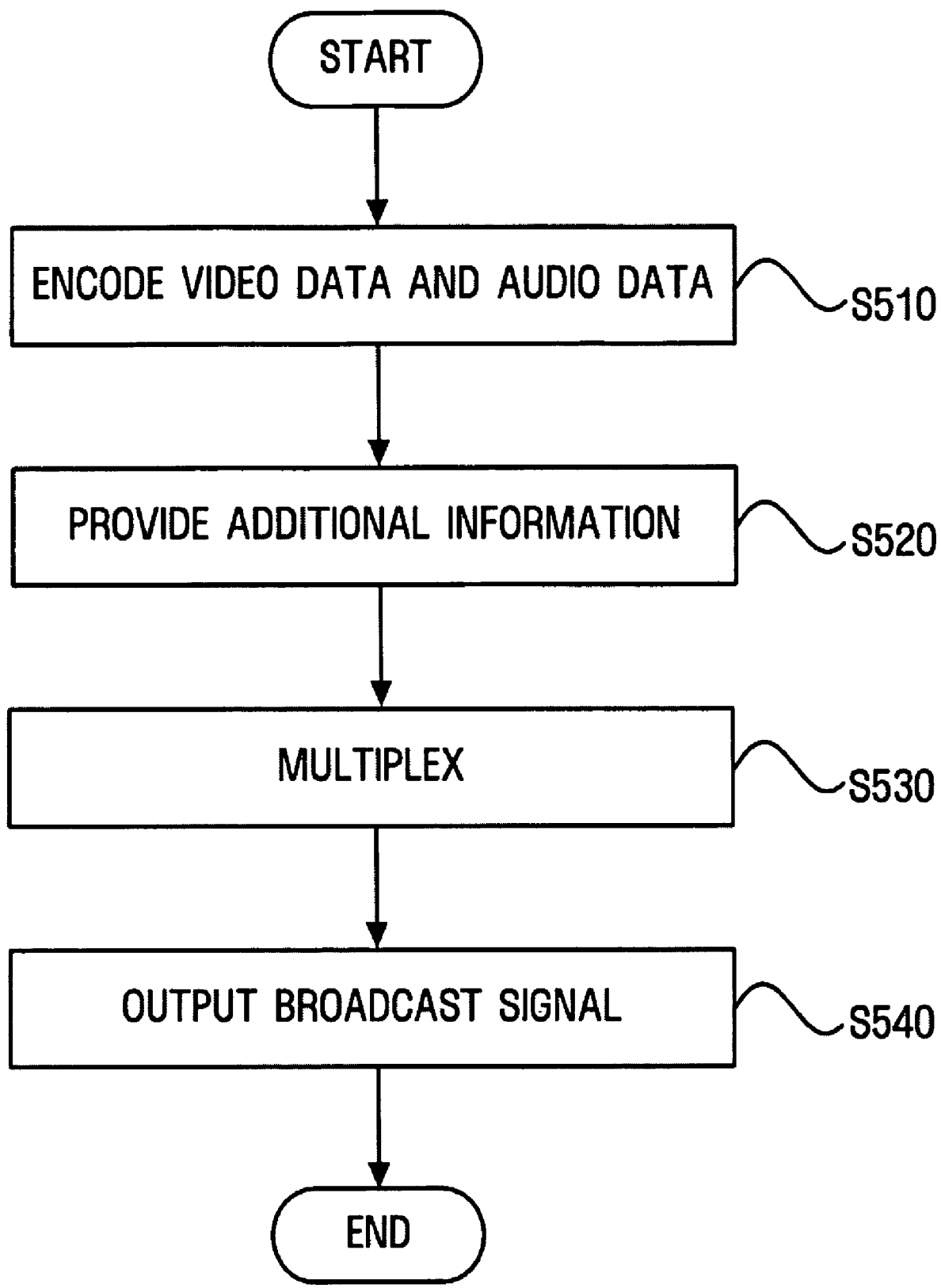

METHOD OF CONNECTING TO INTERNET VIA BROADCAST RECEIVING DEVICE AND APPARATUS FOR THE SAME

CROSS-REFERENCE TO RELATED APPLICATION

This application is based on and claims priority from Korean Patent Application No. 10-2005-0103820 filed on Nov. 1, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to an Internet connection via a broadcast receiving device and, more particularly, to a method and an apparatus that allow a broadcast receiving device to connect to the Internet by receiving information on allocating websites to channel numbers by a broadcast provider.

2. Description of the Related Art

Recently, as broadcast technologies have been developed, the spread of digital broadcasts via satellite, terrestrial wave, and cable broadcasts has increased. A user uses a broadcast receiving device such as a set-top box or a digital TV in order to receive digital broadcasts provided by a broadcast provider. Digital broadcasts consist of compressed video and audio data. A broadcast receiving device uncompresses the video and audio data, and then provides the uncompressed data to a user.

The set-top box and the digital TV, which have been developed to receive and output digital broadcasts, provide several functions that do not exist in a conventional analog TV environment. For example, the digital broadcast includes electronic program guide (EPG) information showing broadcast programs as well as images and sounds. Accordingly, a user can obtain a lot of information on broadcast programs by day, channel, and time.

Preferably, an Internet protocol (IP)-based broadcast receiving device has been provided, which has an IP communication function with a broadcast receiving function. A user can receive an interactive service from a broadcast provider or access the Internet via the IP-based broadcast receiving device. The user can also stream or download various multimedia data such as movies, music, and games.

A text-input means for inputting a web address, such as a uniform resource locator (URL), is needed to connect to the website. However, most control means for the broadcast-receiving means are a remote controller having predetermined functional and numeral buttons, so it is not easy to input a web address in order to connect to a website via the broadcast receiving device. A keyboard may be used to input a web address; however, additional equipment is needed as user interface in order to control the broadcast-receiving device. It is inconvenient for a user that both the remote controller and the keyboard are used to control the broadcast-receiving device.

Korean Unexamined Patent No. 2004-57136: Method for Changing the Internet Site by Allocating the Site to the Channel and the Set-top Box Using the Same discloses a method of connecting to an Internet site by only inputting channel numbers, in which a user allocates numbers to an Internet site and stores them. The disclosed method, however, may be inconvenient because a user directly allocates channel numbers to every Internet site.

SUMMARY OF THE INVENTION

In view of the above, it is an aspect of the present invention for a broadcast provider to allocate a web address to a fixed channel number, thereby making it convenient for a user when (s)he connects to an Internet site via a broadcast-receiving device.

This and other aspects and features of the present invention will become clear to those skilled in the art upon review of the following description, attached drawings and appended claims.

According to an aspect of the present invention, there is provided a method of connecting to the Internet via a broadcast-receiving device, the method including extracting a transport stream of a received broadcast signal, obtaining mapping information between channel numbers and web addresses from the transport stream, and if a channel number selected by a user is a channel number included in the mapping information, connecting to the Internet via a web address mapped to the selected channel number.

According to another aspect of the present invention, there is provided a method of providing information on allocating a website via a broadcast signal, the method including encoding video and audio data of broadcast programs, providing additional information on mapping between channel numbers and web sites, generating a transport stream including the encoded video and audio data, and the additional information, and outputting a broadcast signal including the transport stream.

According to a further aspect of the present invention, there is provided a broadcast-receiving device, the device including a broadcast-receiving module that receives a broadcast signal and extracts a transport stream from the broadcast signal, a restoration module that obtains mapping information between channel numbers and web addresses from the transport stream, and an Internet communication module that connects to the Internet via a web address mapped to the selected channel number if a channel number selected by a user is included in the mapping information.

According to another aspect of the present invention, there is provided a broadcast-outputting device, the device including a video-encoding module that encodes video data of broadcast programs, an audio-encoding module that encodes audio data of the broadcast programs, an additional-information-providing module that provides additional information including mapping information between channel numbers and web addresses, a multiplexing module that generates a transport stream including the encoded video and audio data, and the additional information, and an output module that outputs a broadcast signal including the transport stream.

BRIEF DESCRIPTION OF THE DRAWINGS

The above and other features of the present invention will become apparent by describing in detail exemplary embodiments thereof with reference to the attached drawings in which:

FIG. 6 is flowchart of a method of providing information on allocating a website according to an exemplary embodiment of the present invention;

DETAILED DESCRIPTION OF THE INVENTION

Figure 1:
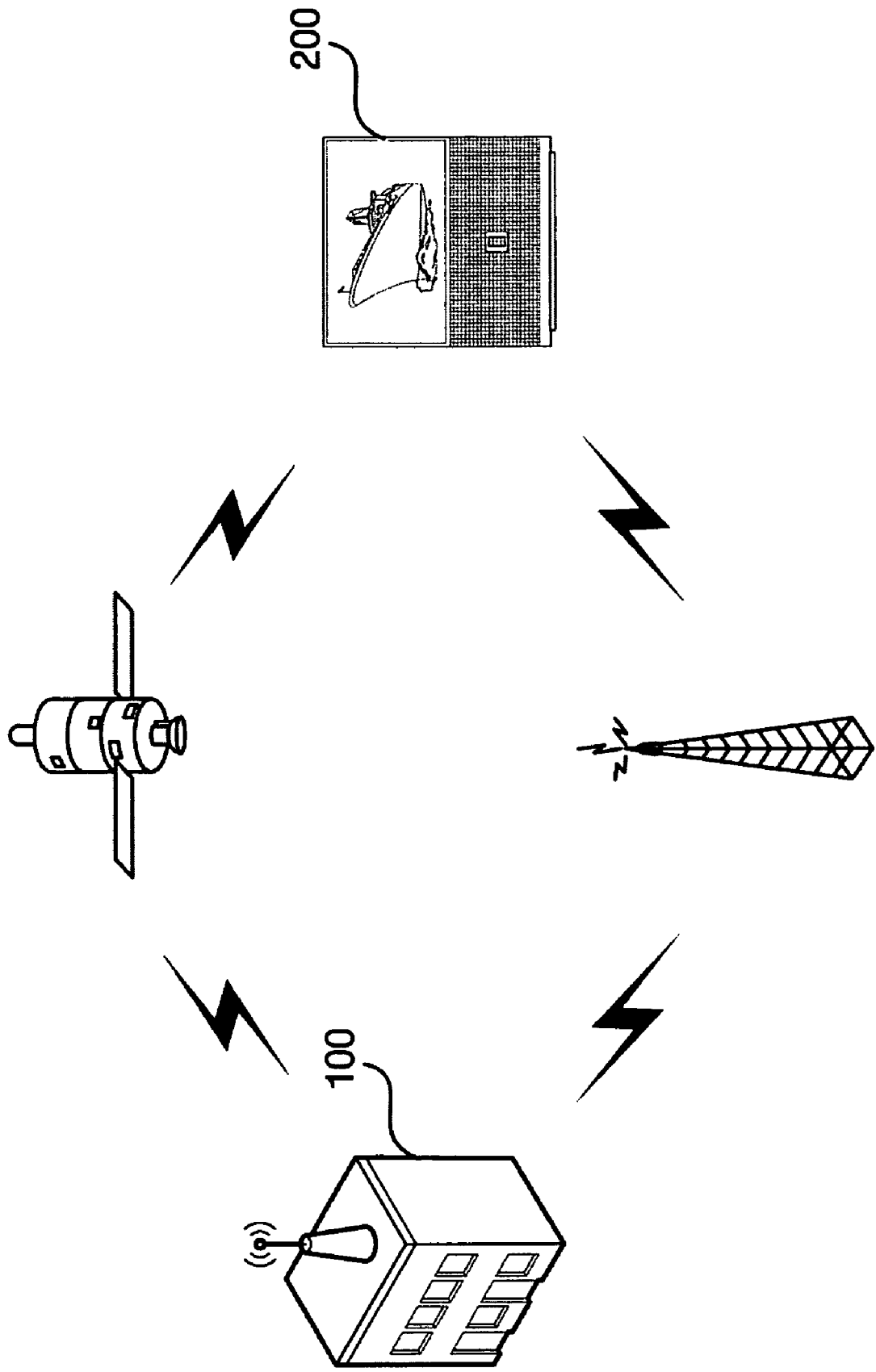
FIG. 1 depicts a broadcast system according to an exemplary embodiment of the present invention.

Exemplary embodiments of the present invention will be described in detail with reference to the accompanying drawings.

Features of the present invention and methods of accomplishing the same may be understood more readily by reference to the following detailed description of the exemplary embodiments and the accompanying drawings. The present invention may, however, be embodied in many different forms and should not be construed as being limited to exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

FIG. 1 depicts a broadcast system according to an exemplary embodiment of the present invention. The illustrated system includes a broadcast-outputting device 100 and a broadcast-receiving device 200.

The broadcast-outputting device 100 output transport stream (TS) including a predetermined broadcast program provided by a broadcast provider. The TS includes video and audio data of the broadcast program, and additional information. The additional information includes mapping information between predetermined channel numbers and web addresses.

The broadcast receiving device 200 obtains mapping information between predetermined channel numbers and web addresses from the TS and stores the obtained mapping information. When a user requests a change of channel, if a general broadcast channel is mapped to the requested channel number, the broadcast receiving device 200 provides a user with broadcasts received via the broadcast channel. If a web address is mapped to the requested channel number, the broadcast receiving device 200 connects to the Internet via the corresponding web address.

Hereinafter, the broadcast-outputting device 100 and the broadcast receiving device 200 will be described in detail.

Figure 2:
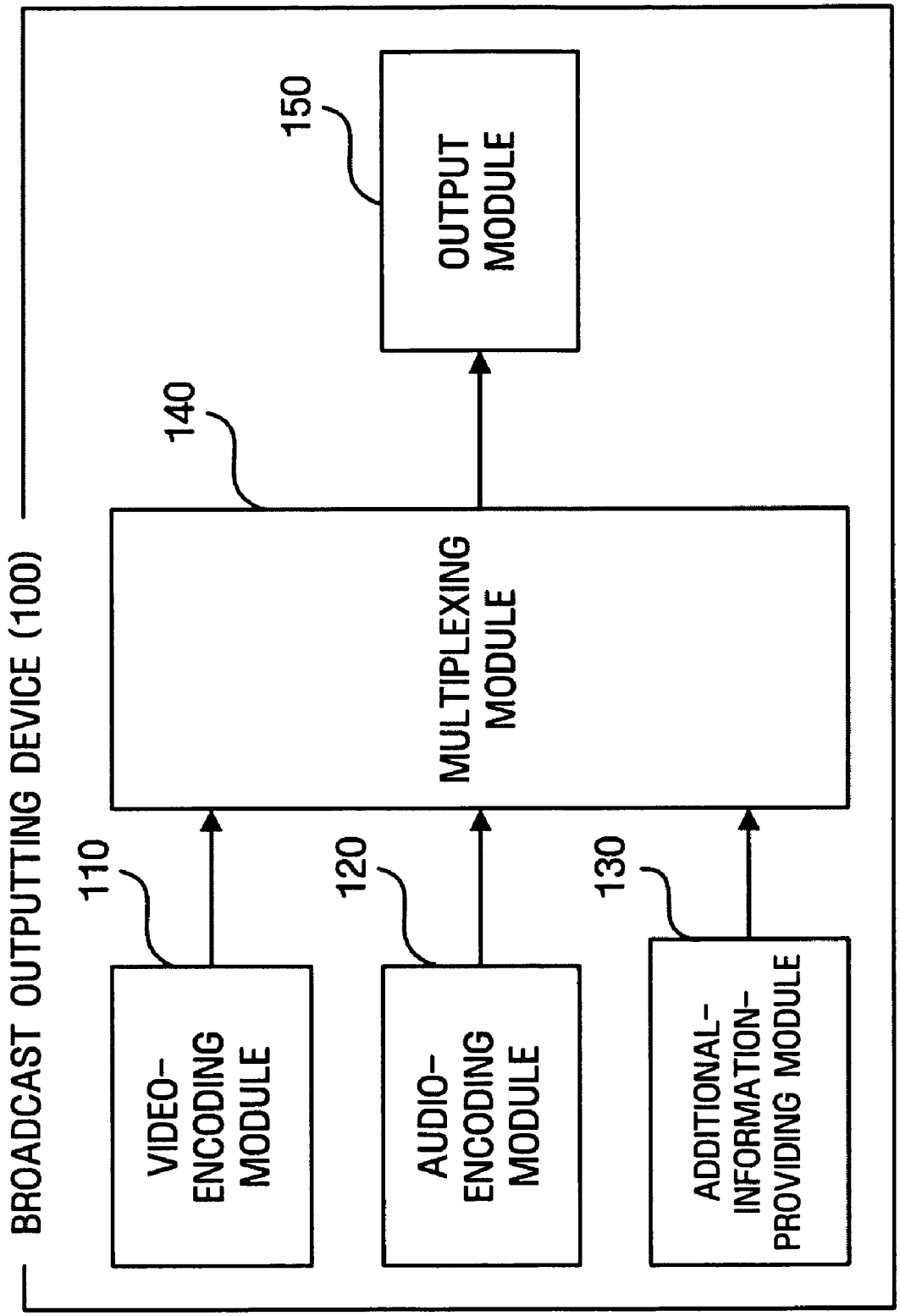
FIG. 2 is a block diagram of a broadcast-outputting device according to an exemplary embodiment of the present invention.

FIG. 2 is a block diagram of a broadcast-outputting device 100 according to an exemplary embodiment of the present invention.

The illustrated broadcast-outputting device 100 includes a video-encoding module 110, an audio-encoding module 120, an additional-information-providing module 130, a multiplexing module 140, and an output module 150.

The video-encoding module 110 encodes video data of a broadcast program provided by a broadcast provider. The video-encoding module 110 may use a video compression method such as the moving picture experts group 2 (MPEG-2) and the moving picture experts group 4 (MPEG-4).

The audio-encoding module 120 encodes audio data of a broadcast program provided by a broadcast provider. The audio-encoding module 120 may use an audio compression method such as MPEG layer 3 (MP3) and audio compression 3 (AC3).

The additional-information-providing module 130 provides additional information needed to a digital broadcast. For example, the additional information may include time, EPG, and scramble information. Especially, the additional information includes mapping information between predetermined channel numbers and web addresses according to an exemplary embodiment of the present invention. Also, the additional information may include information on the website able to be connected by the web address mapped to the channel number. Here, information on the website includes a website name, web address, website banner, and guide information on the website. The guide information shows details of the website such as types of content provided by the website and services available on the website. The mapping information and website information may be included in the EPG information.

As a specific exemplary embodiment, the additional information may include program specific information (PSI) and a program and system information protocol (PSIP).

The PSIP provides the PSI. The PSI shows broadcast program-to-be-selected among several broadcast programs, a packet-to-be-obtained for the broadcast program-to-be-selected, and a method of demodulating the packet-to-be-obtained. More particularly, the PSI may include the program association table (PAT), program map table (PMT), and conditional access table (CAT), and network information table (NIT).

The PAT, as a table of which a packet identifier (PID) is "0", includes the PID of the PMT. The PMT includes the PID for a TS packet composing a single program. The CAT includes conditional access information that enables an authorized user to decode the scrambled bit string. The NIT includes physical network information on an area where broadcasts will be received.

The PSIP includes several tables that standardize information needed by the digital broadcast, which is offered by the ATSC (advanced television systems committee), and is established in order to develop a digital TV standard for the U.S. More particularly, PSIP includes the system-time table (STT), master guide table (MGT), virtual channel table (VCT), rating region table (RRT), event information table (EIT), and extended text table (ETT).

The STT includes date and time information.

The MGT has the PID and a version value of all tables except the STT. It is possible to reduce system loads by checking the version value via the MGT because other tables need not check each version.

The VCT includes information on a virtual channel. More particularly, the VCT includes information on channel names, physical transmission channel (PTC) numbers, stream components, and types.

The RRT includes rating information on broadcast content. Accordingly, the broadcast-receiving device 200 may determine whether to play broadcast content by comparing ratings set by a user and rating information included in the RRT. If a broadcast program, which is intended for viewers over 18 in the RRT, is received when the broadcast-receiving device 200 is set for viewers over 15 only, the broadcast-receiving device 200 may not perform restoring of the video and audio data of the received broadcast program.

The EIT includes general information on broadcast program of all channels set in a VCT within a predetermined time scope. In general, the EIT may include the titles of broadcast programs.

The ETT includes detailed information on broadcast program of all channels set in a VCT within a predetermined time scope. For example, the ETT may include plots, backgrounds, and genres of broadcast programs.

By the additional-information-providing module 130, channel numbers and mapping information of a web address may be included in the PSIP. For example, mapping information may be included in the VCT or EIT.

By the additional-information-providing module 130, information on the website may be included in the EIT or ETT. For example, the EIT may include text of web addresses mapped to channel numbers, names and banners of a website able to be connected to via the web address. The ETT may include guide information on a website. When the broadcast-receiving device 200 obtains the additional information, the broadcast-receiving device 200 provides a user with the channel numbers mapping web addresses and information on a website able to be connected to by the web address mapped to each channel number via the EPG.

The multiplexing module 140 generates single TS by multiplexing the video data encoded by the video-encoding module 110, the audio data encoded by the audio-encoding module 120, and the additional information provided by the additional-information-providing module 130.

The output module 150 outputs the broadcast signal including the TS generated by the multiplexing module 140. The output module 150 may perform a predetermined modulation of the TS. For example, the output module 150 may perform the quadratic phase shift keying (QPSK) modulating operation and the forward error correction (FEC) information inputting operation. Then, the output module 150 converts the modulated signal into intermediate frequency (IF) and transmits the IF via the carrier.

The broadcast-outputting device 100 may include several program encoders that consist of the video-encoding module 110, audio-encoding module 120, and the multiplexing module 140 to multiplex the encoded video data and audio data. The broadcast-outputting device 100 further includes a final multiplexing module (not shown) that multiplexes the TS output by each single program encoder and the additional information provided by the additional-information-providing module 130.

Figure 3:
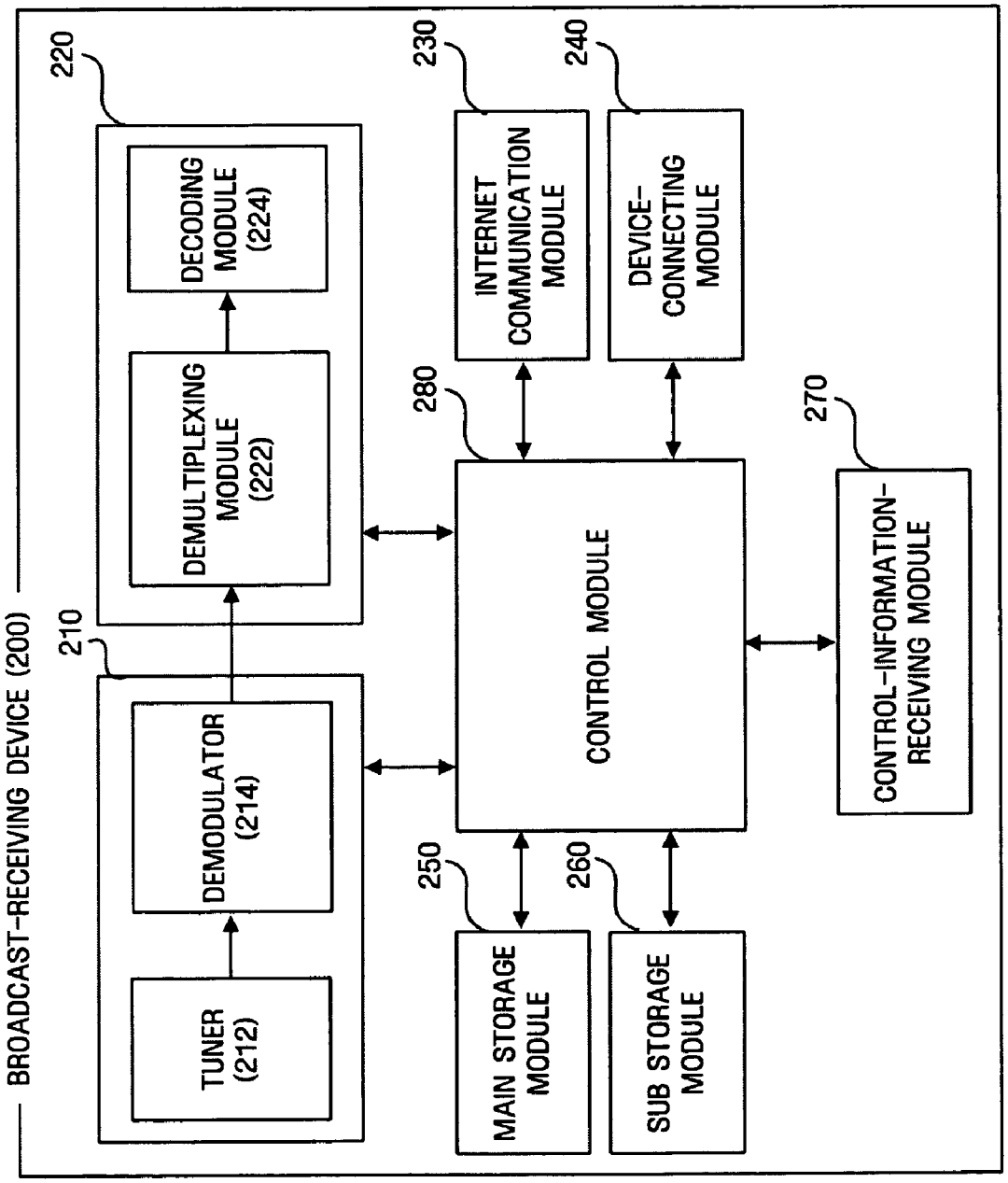
FIG. 3 is a block diagram of a broadcast-receiving device according to an exemplary embodiment of the present invention.

FIG. 3 is a block diagram of a broadcast-receiving device 200 according to an exemplary embodiment of the present invention.

The illustrated broadcast-receiving device 200 includes a broadcast-signal-receiving module 210, a restoration module 220, an Internet communication module 230, a device-connecting module 240, a main storage module 250, a sub storage module 260, a control-information-receiving module 270, and a control module 280. The broadcast-receiving device 200 may be embodied as an IP-based set-top box or a digital TV.

The broadcast-signal-receiving module 210 receives broadcast signals and includes a tuner 212 and a demodulator 214.

The tuner 212 receives broadcast signals, converts the received broadcast signals into IF signals, and provides the IF signals to the demodulator 214. For example, the tuner 212 detects in-phase/quadrature-phase (I/Q) signal by processing signals received from satellite, and provides the detected I/Q signal to the demodulator 214.

The demodulator 214 extracts the IF and provides the extracted TS to the restoration module 220. For example, the demodulator 214 may consist of a quadratic phase shift keying (QPSK) demodulator (not shown) and a forward error correction (FEC) demodulator (not shown), thereby performing QPSK demodulation and FEC operation.

The broadcast signal is not limited to transmission methods such as satellite broadcasts, terrestrial waves, and cable broadcasts.

The restoration module 220 restores video and audio data, and additional information through the TS. To restore the video and audio data and additional information, the restoration module 220 includes a demultiplexing module 222 and a decoding module 224.

The demultiplexing module 222 separates the video and audio data and additional information by parsing the TS, and provides the decoding module 224 with the parsed video and audio data and additional information.

Figure 4:
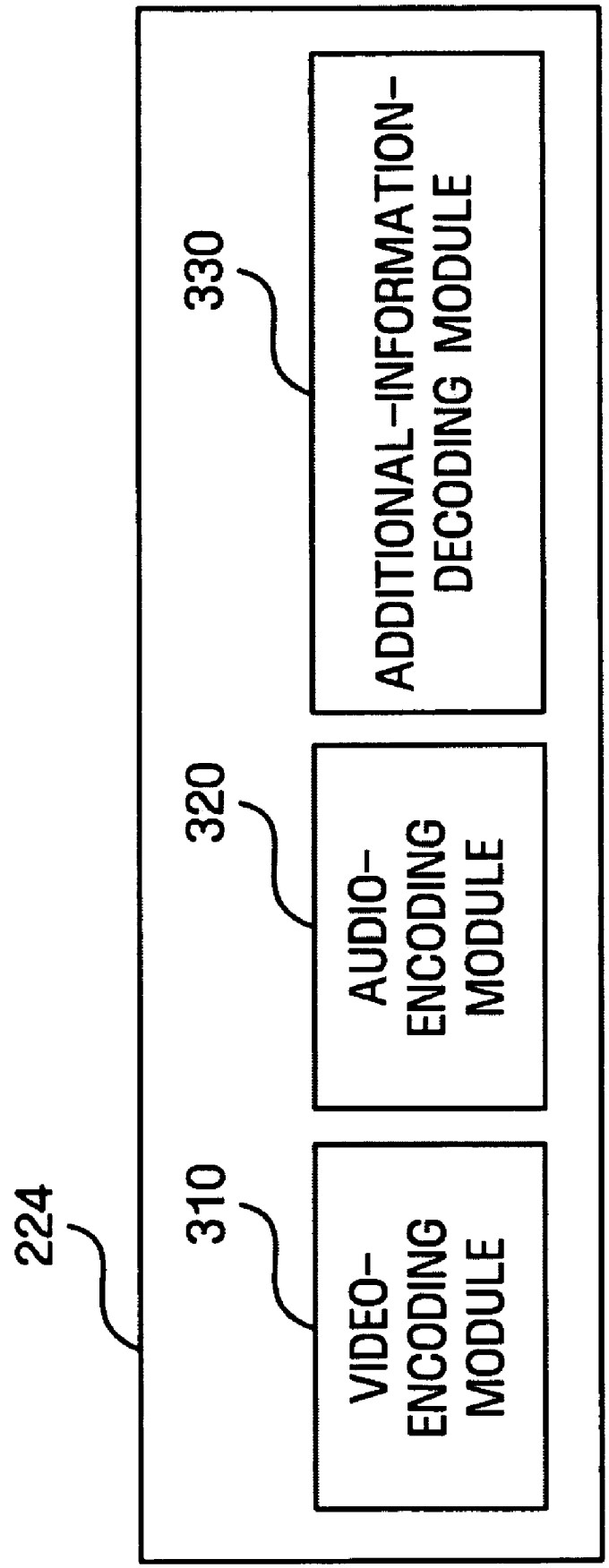
FIG. 4 is a block diagram showing a decoding module of the broadcast-receiving device illustrated in FIG. 3 in detail according to an exemplary embodiment of the present invention.

As illustrated in FIG. 4, the decoding module 224 includes a video-decoding module 310 and an audio-decoding module 320, each of them decodes video and audio data provided by the demultiplexing module 222. The video-decoding module 310 may use the MPEG-2 and MPEG-4. The audio-decoding module 320 may use the MP3 and AC3. The video-decoding module 310 and the audio-decoding module 320 may use video and audio decompressing methods corresponding to the video and audio compressing methods used by the video-encoding module 110 and the audio-encoding module 120 of the broadcast-outputting device 100.

The decoding module 224 includes an additional-information-decoding module 330 that decodes the additional information provided by the demultiplexing module 222. The additional information is the same as that described with reference to the broadcast-outputting device 100 of FIG. 2. That is, the additional information includes mapping information between predetermined channel numbers and web addresses, and information on a website that can be connected to via the web address. Accordingly, the additional-information-decoding module 330 can obtain mapping information and information on the website. For example, the additional-information-decoding module 330 may extract mapping information and information on the website from the EPG information included in the additional information. More particularly, if the additional information includes the PSIP, the additional-information-decoding module 330 may obtain mapping information via the VCT or EIT of the PSIP, and information on the website via the EIT or ETT of the PSIP.

The main storage module 250 stores information needed in case of performing a program stored in the sub storage module 260 or operating a predetermined application. That is, the main storage module 250 can store input and output information and an interim calculation result according to operation of the control module 280. The main storage module 250 may include RAM such as SRAM and DRAM, and ROM such as EP-ROM, EEP-ROM, and MASK-ROM.

The sub storage module 260 has firmware and stores several types of programs, such as a web browser and other application operating programs. The sub storage module 260 also stores the additional information decoded by the decoding module 224. The sub storage module 260 may include hard disk or flash memory.

The device-connecting module 240 communicates with an audio/video (AV) device (not shown). For example, the device-connecting module 240 may be connected to a TV or a personal video recorder (PVR). To prevent unauthorized copy of content when communicating with the AV device, the device-connecting module 240 may use a security protocol such as the high-bandwidth digital content protection (HDCP) and the digital transmission content protection (DTCP).

The control-information-receiving module 270 receives a user's request in order to control the broadcast-receiving device 200. The control-information-receiving module 270 includes an infrared light receiver able to receive control signals of a remote controller, or an input means such as a keypad able to be directly handled by a user. Accordingly, the control-information-receiving module 270 can receive a user's request for changing a channel.

The Internet communication module 230 supports IP-based communication. For example, the Internet communication module 230 may be connected to the Internet via cable, a telephone wire, or an x digital subscriber line (xDSL). If the control-information-receiving module 270 receives a request for changing a channel from a user, and the channel number is included in the mapping information obtained from the additional information of the TS, the Internet communication module 230 runs a web browser, and connects to the website by using the web address mapped to the channel.

According to an exemplary embodiment, the broadcast-receiving device 200 may receive a broadcast signal via the Internet communication module 230. In this case, the restoration module 220 restores the broadcast signal received by the Internet communication module 230. Also, the broadcast-receiving device 200 is connected to a broadcast provider via the Internet communication module 230, thereby providing an interactive service.

The control module 280 controls the various operations performed by the broadcast-receiving device 200. Accordingly, the control module 280 controls the modules 210 to 270 that compose the broadcast-receiving device 200. When the control module 280 receives a request for changing a channel from a user, the control module 280 checks whether the channel number is connected to a website through the additional information stored in the sub storage module 260. That is, a channel number, mapped to a web address, is a channel connected to a website. If the channel number requested to be changed is included in mapping information of the additional information, the control module 280 controls the Internet communication module 230 so that the Internet communication module 230 is connected to the Internet by the web address mapped to the channel. If the channel number requested to be changed is mapped to a general broadcast channel, the control module 280 controls the tuner 212 so that the tuner 212 receives broadcast signals.

When the control-information-receiving module 270 receives a request for EPG information, the control module 280 outputs the EPG information of the additional information stored in the sub storage module 260 to a TV via the device-connecting module 240. If the broadcast-receiving device includes a display module such as an LCD or a PDP, which is not shown, the control module 280 may provide the EPG information via the display module.

The term "module" may include, but is not limited to, a software or hardware component, such as a Field Programmable Gate Array (FPGA) or Application Specific Integrated Circuit (ASIC), which executes certain tasks. A module may be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 5A:
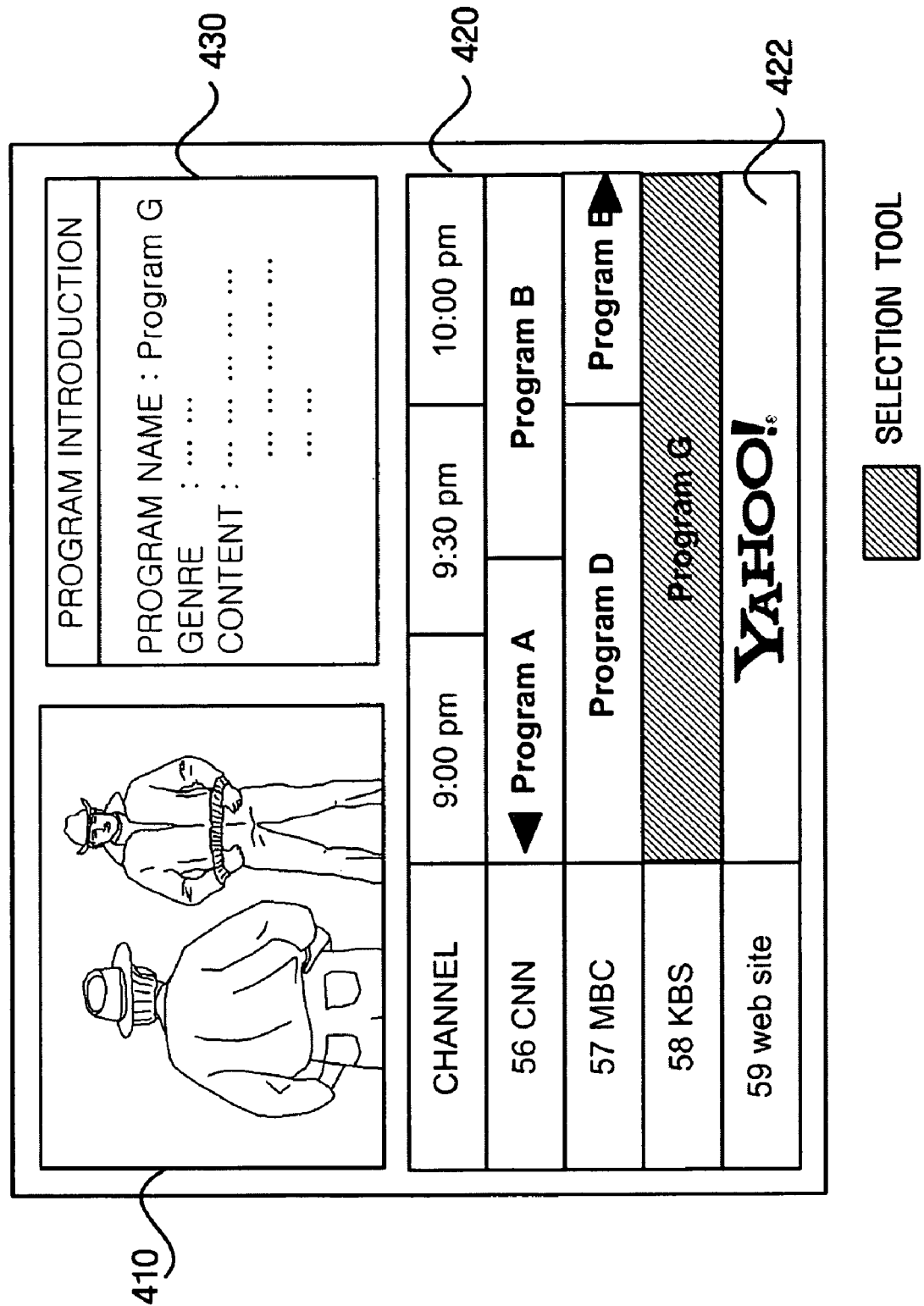
FIGS. 5A and 5B depict an EPG screen according to an exemplary embodiment of the present invention.

FIG. 5A depicts an EPG screen according to an exemplary embodiment of the present invention.

The illustrated EPG screen includes a broadcast display area 410, a schedule area 420, and a detailed information-providing area 430.

On the broadcast display area 410, a broadcast program that a user desires to view is displayed.

The schedule area 420 displays a channel number, a broadcast channel and a name of the program mapped to the channel number, and information on a website mapped to the channel. More particularly, for a channel number allocated to a broadcast channel, names of broadcast programs provided at each time are displayed. For a channel number allocated to a website, information on a website is displayed. In FIG. 5A, a website banner 422 is displayed using channel 59, which means that the website indicated by the website banner 422 may be connected to when channel 59 is selected. For the channel number allocated to the website, it is possible to display a lot of information for identifying websites such as addresses and names of websites except the website banner.

Figure 5B:
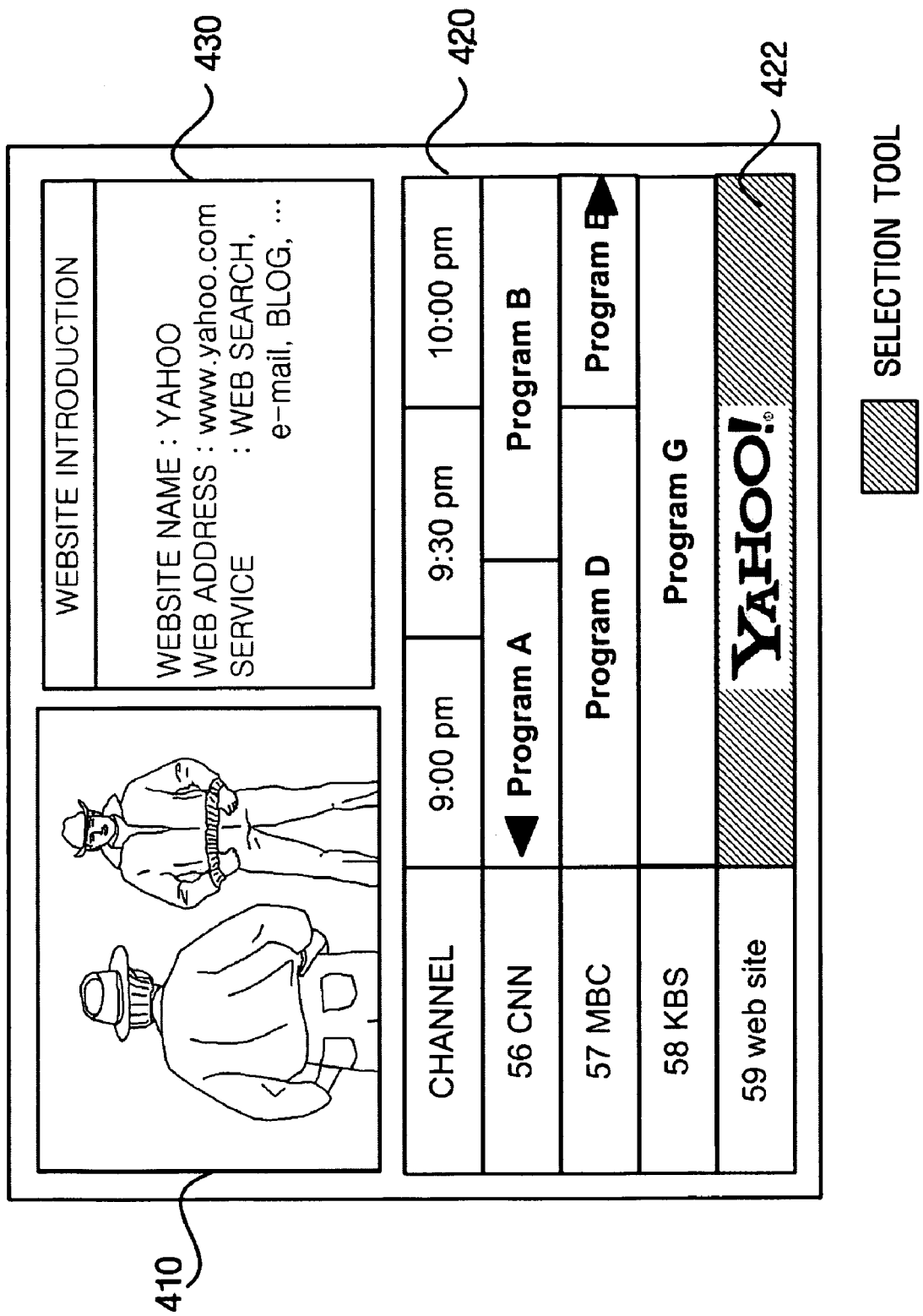

In the detailed information providing area 430, detailed information on a broadcast program selected by a selection tool is displayed in the schedule area 420. Because the selection tool locates a program G of channel 58, as illustrated in FIG. 5A, detailed information on program G is displayed in the detailed information providing area 430. If a user moves the selection tool on the website banner 422 by a remote controller, guide information on the website can be displayed in the detail information providing area 430 as illustrated in FIG. 5B.

FIG. 6 is flowchart of a method of providing information on allocating a website according to an exemplary embodiment of the present invention. The illustrated flowchart is performed by the broadcast-outputting device 100.

The video-encoding module 110 and the audio-encoding module 120 encode video and audio data (S510).

The additional-information-providing module 130 creates predetermined additional information (S520). The additional information includes information on digital broadcasts (as described above). Especially, the additional information includes mapping information mapping channels and web addresses. The additional information also includes information on the website that can be connected to by the web address mapped to the channel. Mapping information and website information may be included in the EPG information included in the additional information. More particularly, if the additional information includes the PSIP, the mapping information may be included in the VCT or EIT of the PSIP, and the website information may be included in the EIT or ETT of the PSIP.

The multiplexing module 140 multiplexes the encoded video and audio data, and the additional information (S530).

The output module 150 outputs the broadcast signal including the TS generated by the multiplexing module 140 (S540).

Figure 7:
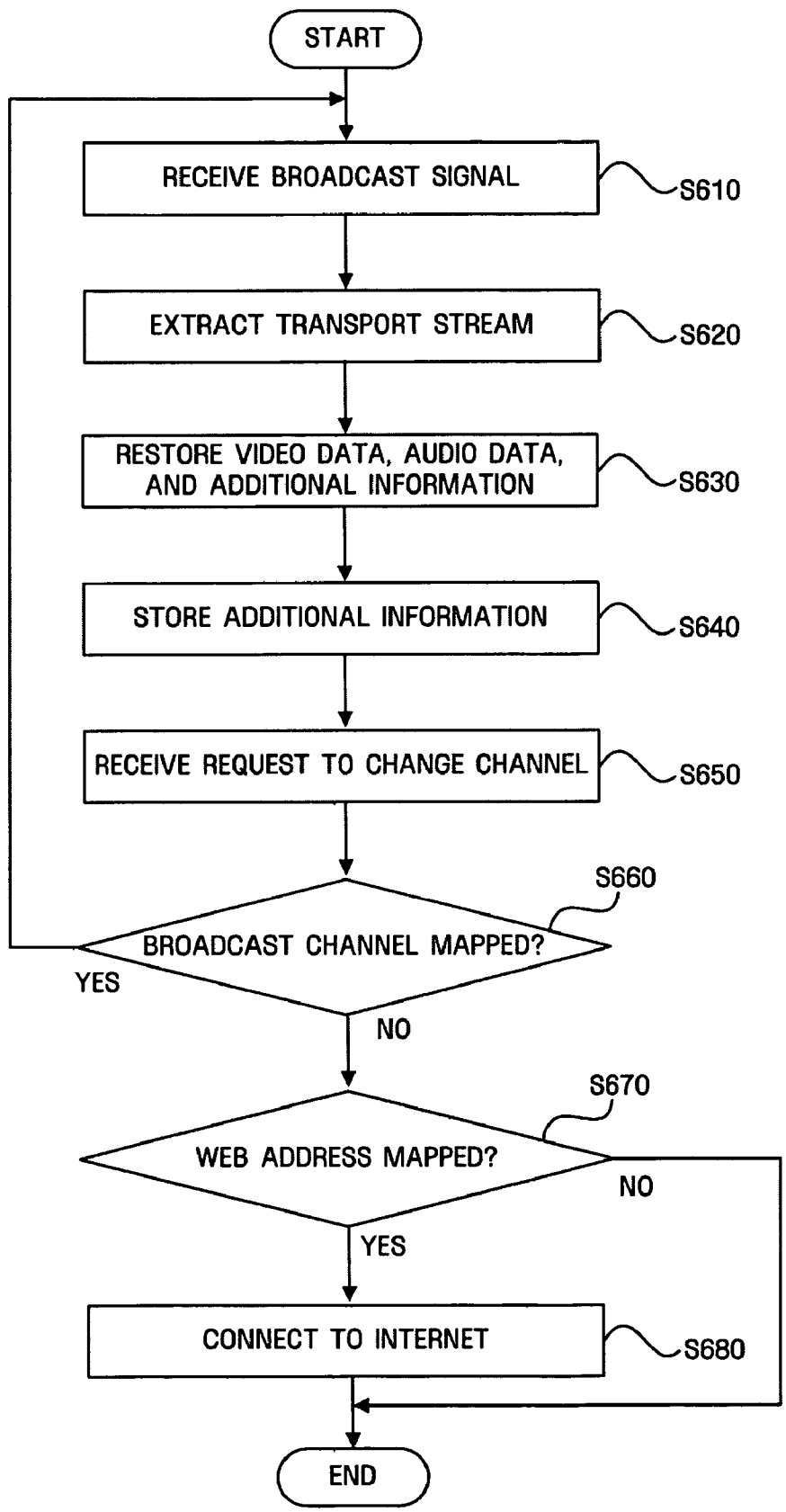
FIG. 7 is a flowchart of a method of connecting to the Internet via a broadcast receiving device according to an exemplary embodiment of the present invention.

FIG. 7 is a flowchart of a method of connecting to the Internet via a broadcast-receiving device 200 according to an exemplary embodiment of the present invention.

When the broadcast-receiving module 210 receives the broadcast signal output by the broadcast-outputting device 100 (S610), and extracts the TS from the received broadcast signal (S620), the restoration module 220 restores video and audio data, and additional information from the TS (S630).

The restored video and audio data may be output via the device-connecting module 240. As described with reference to FIGS. 3 and 4, the additional-information-decoding module 330 of the restoration module 220 may obtain the EPG information from the additional information. Here, the EPG information may include mapping information mapping channels and web addresses, and information on the website able to be connected to via the web address. More particularly, if the additional information includes the PSIP, the additional-information-decoding module 330 may obtain mapping information via the VCT or EIT of the PSIP, and information on the website via the EIT or ETT of the PSIP.

The sub storage module 260 stores the additional information obtained by the restoration module 220 (S640). Accordingly, the EPG information or the PSIP are stored in the sub storage module 260, and can be managed by the control module 280.

When the control-information-receiving module 270 receives a user's request to change channel (S650), The control module 280 checks whether the channel requested to be changed to is mapped to a broadcast channel (S660). If the channel requested to be changed to is mapped to a broadcast channel, the tuner 212 receives a broadcast signal corresponding to the broadcast channel (S610).

If the channel requested to be changed to is not mapped to a broadcast channel, the control module 280 checks whether the channel number requested to be changed to is mapped to a web address (S670).

If the channel requested to be changed to is mapped to a web address, the Internet communication module 230 runs the web browser stored in the sub storage module 260, and connects to the Internet via the web address mapped to the channel number (S680).

Whether the channel numbers are allocated to broadcast channels or websites can be checked through the additional information stored in the sub storage module 260.

Figure 8:
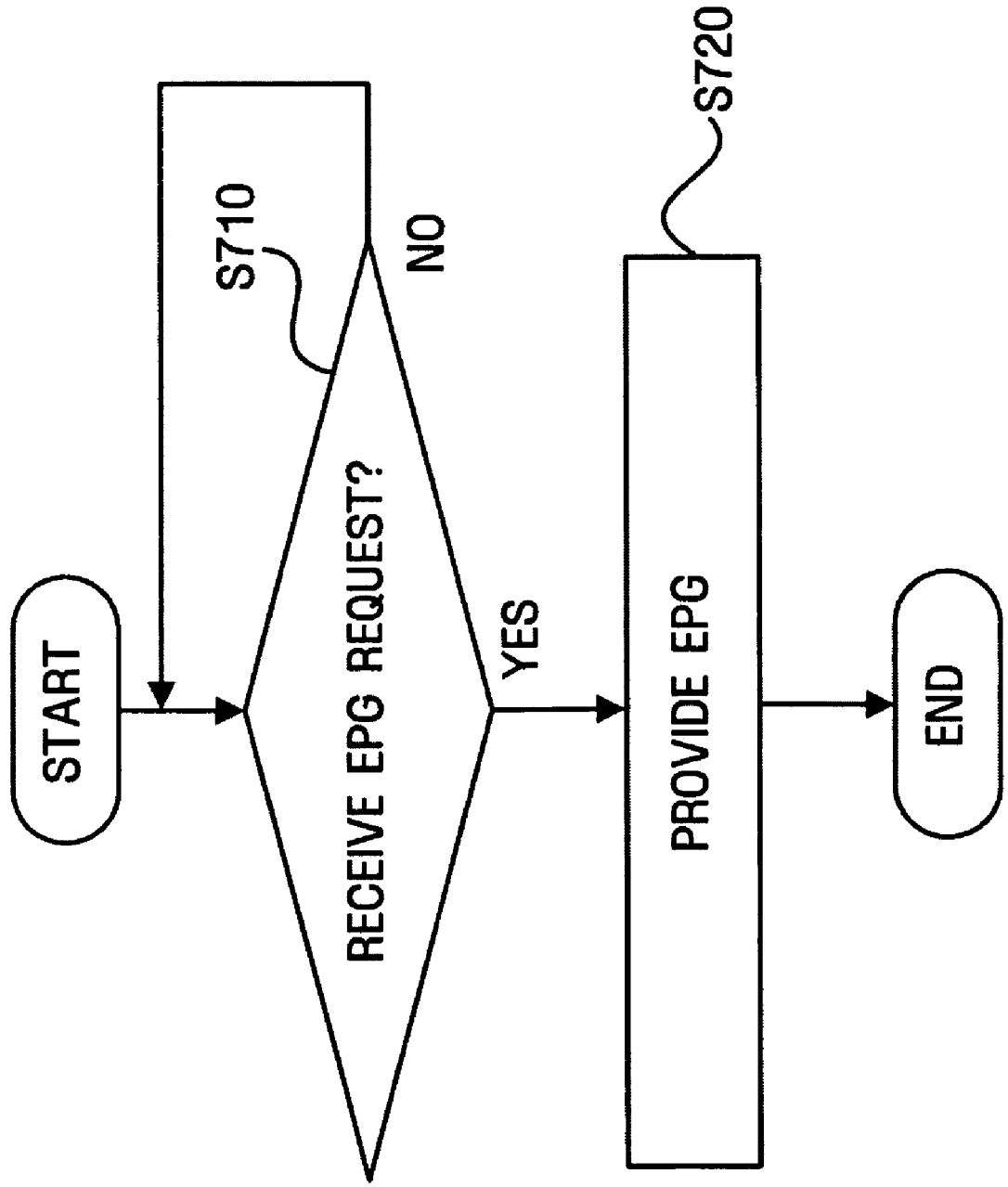
FIG. 8 is a flowchart that shows providing EPG information according to an exemplary embodiment of the present invention.

FIG. 8 is a flowchart that shows providing EPG information according to an exemplary embodiment of the present invention.

While the operation, which is described with reference to FIG. 7, is performed, when the control-information-receiving module 270 receives a user's request for the EPG (S710), the control module 280 provides the EPG information stored in the sub module 260 (S720). The EPG information includes mapping information and website information as described above. More particularly, the control module 280 may provide information included in the VCT, EIT, and ETT of the PSIP stored in the storage module as the EPG information. The EPG information may be output to a TV via the device-connecting module 240, or displayed to a user via a display module that is not shown.

According to the present invention, it is convenient for a user to connect to a website via a broadcast-receiving device.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of connecting to the Internet via a broadcast receiving device, comprising:
performing by a processor:
  extracting a transport stream (TS) from a received broadcast signal;
  obtaining mapping information between channel numbers and web addresses from the TS; and
  connecting to the Internet via a web address mapped to a channel number selected by a user if the selected channel number is included in the mapping information, or receiving a general broadcast if the selected channel number is mapped to a general broadcast channel.

2. The method of claim 1, wherein the obtaining the mapping information includes obtaining the mapping information from a program and system information protocol (PSIP) included in the TS.

3. The method of claim 2, wherein the obtaining the mapping information includes obtaining the mapping information via at least one of a virtual channel table (VCT) and an event information table (EIT) of the PSIP.

4. The method of claim 1, further comprising:
obtaining information on a website corresponding to one of the web addresses from the TS.

5. The method of claim 4, wherein the information on the website includes at least one of a website name, a website address, a website banner, and guide information on the website.

6. The method of claim 4, wherein the obtaining the information on the website includes obtaining the information on the website via at least one of an event information table (EIT) and an extended text table (ETT) of program and system information protocol (PSIP) included in the TS.

7. The method of claim 4, further comprising:
providing at least one of the mapping information and the information on the website as electronic program guide (EPG) information.

8. The method of claim 4, further comprising:
obtaining electronic program guide (EPG) information from the TS;
providing the EPG information upon a user's request;
wherein the EPG information includes at least one of the information on the website corresponding to one of the web addresses and the mapping information.

9. The method of claim 8, wherein the information on the website includes at least one of a website name, a website address, and a website banner.

10. The method of claim 1, wherein the mapping information is provided by a broadcast provider.

11. The method according to claim 1, wherein the mapping information is included in an additional information of the broadcast signal.

12. A method of providing information on allocating websites via a broadcast signal, comprising:
performing by a processor:
  encoding video and audio data of broadcast programs;
  providing additional information including mapping information mapping channel numbers and web addresses;
  generating a transport stream (TS) including the encoded video and audio data, and the additional information; and
  outputting a broadcast signal including the TS,
  wherein the channel numbers included in the additional information are respectively allocated to broadcast providers, and if a channel is changed by a user, a broadcast signal provided by one of the broadcast providers corresponding to the changed channel is transmitted via the channel.

13. The method of claim 12, wherein the additional information includes a program and system information protocol (PSIP), and the mapping information is included in the PSIP.

14. The method of claim 12, wherein the mapping information is included in at least one of a virtual channel table (VCT) and an event information table (EIT) of program and system information protocol (PSIP).

15. The method of claim 12, wherein the additional information also includes information on a website that corresponds to one of the web addresses.

16. The method of claim 15, wherein the information on the website includes at least one of a website name, a website address, a website banner, and guide information on the website.

17. The method of claim 15, wherein the information on the website is included in at least one of an event information table(EIT) and an extended text table (ETT) of program and system information protocol (PSIP) included in the TS.

18. A broadcast-receiving device comprising:
   a broadcast-receiving module that receives a broadcast signal and extracts transport stream (TS) from the broadcast signal;
   a restoration module that obtains mapping information between channel numbers and web addresses from the TS;
   an Internet communication module that connects to the Internet via a web address mapped to a channel number selected by a user if the channel number selected by a user is included in the mapping information; and
   a broadcast signal receiving module that receives a general broadcast if the selected channel number is mapped to a general broadcast channel.

19. The device of claim 18, wherein the restoration module obtains the mapping information from a program and system information protocol (PSIP) included in the TS.

20. The device of claim 19, wherein the restoration module obtains the mapping information via at least one of a virtual channel table (VCT) and an event information table (EIT) of the PSIP.

21. The device of claim 18, wherein the restoration module obtains information on a website that corresponds to one of the web addresses from the TS.

22. The device of claim 21, wherein the information on the website includes at least one of a website name, a web address, a website banner, and guide information on the website.

23. The device of claim 21, wherein the restoration module obtains the information on the website via at least one of an event information table (EIT) and an extended text table (ETT) of a program and system information protocol (PSIP) included in the TS.

24. The device of claim 21, wherein further comprising:
   a control module that provides at least one of the mapping information and the information on the website as electronic program guide information.

25. The device of claim 18, further comprising:
   a control module that provides electronic program guide (EPG) information upon a user's request;
   wherein the restoration module extracts the EPG information from the TS and includes at least one of the information on one or more websites that correspond to one or more of the web addresses and the mapping information.

26. The device of claim 25, wherein the information on the one or more websites includes at least one of a website name, a website address, and a website banner.

27. A broadcast-outputting device comprising:
   a video-encoding module that encodes video data of broadcast programs;
   an audio-encoding module that encodes audio data of broadcast programs;
   an additional-information-providing module that provides additional information including mapping information that maps channel numbers and web addresses;
   a multiplexing module that generates a transport stream (TS) including the encoded video and audio data, and the additional information; and
   an output module that outputs a broadcast signal including the TS,
   wherein the channel numbers included in the additional information are respectively allocated to broadcast providers, and if a channel is changed by a user, a broadcast signal provided by one of the broadcast providers corresponding to the changed channel is transmitted via the channel.

28. The device of claim 27, wherein the additional information includes a program and system information protocol (PSIP), and the mapping information included in the PSIP.

29. The device of claim 28, wherein the mapping information is included in a virtual channel table (VCT) of the PSIP.

30. The device of claim 27, wherein the additional information further includes information on a website that corresponds to one of the web addresses.

31. The device of claim 30, wherein the website information includes at least one of a website name, a website address, a website banner, and guide information on the website.

32. The device of claim 30, wherein the website information is included at least one of an event information table (EIT) and an extended text table (ETT) of the PSIP included in the TS.

* * * * *